H. H. HARDINGE.
METHOD OF PROVIDING NICK PROJECTIONS ON TYPE MOLD BODY BLOCKS.
APPLICATION FILED JULY 31, 1909.
973,191.　　　　　　　　　　　　　　　Patented Oct. 18, 1910.
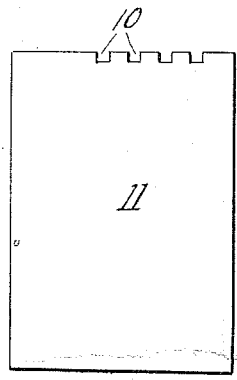
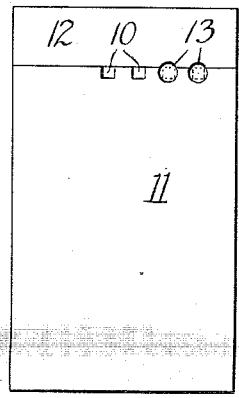
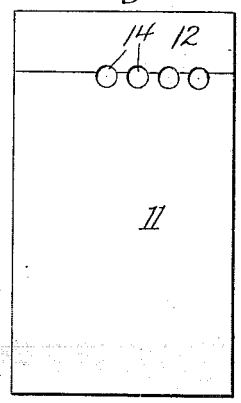
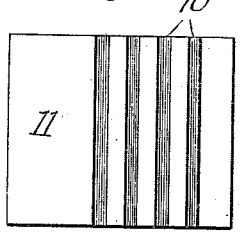
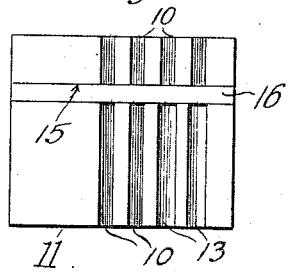
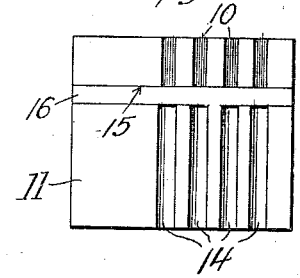
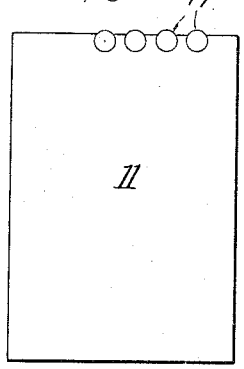
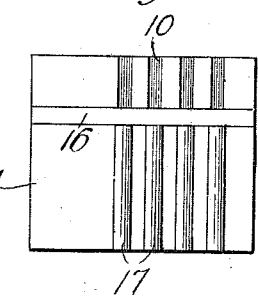
Witnesses
H. R. White
M. A. Kiddie
Inventor
Henry H. Hardinge
By Linthicum Belt & Fuller
Att'ys

UNITED STATES PATENT OFFICE.

HENRY H. HARDINGE, OF CHICAGO, ILLINOIS, ASSIGNOR TO WIEBKING, HARDINGE & CO., OF CHICAGO, ILLINOIS, A CORPORATION OF ILLINOIS.

METHOD OF PROVIDING NICK PROJECTIONS ON TYPE-MOLD BODY-BLOCKS.

973,191.  Specification of Letters Patent.  Patented Oct. 18, 1910.

Application filed July 31, 1909. Serial No. 510,505.

*To all whom it may concern:*

Be it known that I, HENRY H. HARDINGE, a citizen of the United States, residing at Chicago, in the county of Cook and State of Illinois, have invented new and useful Improvements in Methods of Providing Nick Projections on Type-Mold Body-Blocks, of which the following is a specification.

The nicks in the shank of a type have heretofore been produced by projections made integral with the body block of the type mold but this has been objectionable because of the difficulty in properly producing the projections on the body block in exact parallelism and in the same plane with each other. In hardening the body block the surface which bears the projections becomes irregular by the internal stresses of the steel and it has been necessary to put the mold body on the body block and wear the latter down with fine emery to an exact fit. It is essential that the mold body and the body block should make an exact fit to prevent the formation of fins on the type and it is also essential that the projections which make the nicks should be in exact parallelism so that the body may travel freely on the body block to discharge large or small type from the type space of the mold. It has been impossible from a practical standpoint heretofore to drill grooves in the body block to receive pins for forming the nicks because the variations in density of the steel make the drills run off so that the grooves for the nick pins are not parallel. Such grooves are too small and too deep for a boring tool and they can not be made in that way. It has also been attempted to provide the integral nick projections on strips and insert these strips in recesses in the body block but this is a very expensive method and the strips are very difficult to make and fit.

The object of my invention is to simplify and improve the method of providing the body block of a type mold with projections for forming the nicks in the type.

In the accompanying drawings illustrating my invention Figure 1 is an elevation and Fig. 2 is a top plan view of a mold body block showing the first step of my invention. Fig. 3 is an elevation showing the second step of my invention and Fig. 4 is a top plan view of the mold body block illustrated in Fig. 3. Fig. 5 is an elevation showing the third step of my invention and Fig. 6 is a top plan view of the mold body block shown in Fig. 5. Fig. 7 is an elevation and Fig. 8 is a top plan view of a mold body block with the nick pins therein according to my invention. Fig. 9 is a detail view of one of the nick pins.

In the practice of my invention I first cut a plurality of rectangular grooves 10 entirely across the face of the body block (Figs. 1, 4) with a suitable milling tool. These grooves are in exact parallelism and they are of equal depth and width and proportion in these dimensions to the depth required for the nick. I then clamp another block 12 by any suitable means on the face of the body block over the rectangular grooves 10 therein (Fig. 3) and counter-bore the rectangular grooves with a boring tool whose pilot is of the same diameter as the width and depth of the rectangular groove and whose external diameter is equal to the diagonal diameter of the rectangular groove, thereby changing the rectangular groove to a circular groove 13 whose diameter is equal to the diagonal diameter of the rectangular groove (Figs. 3, 4). I then counter-bore the circular grooves 13 with a boring tool whose external diameter is one and one-half thousandths smaller than the nick pin to be inserted therein to form the grooves 14 (Figs. 5, 6) and finish these grooves with a reamer whose external diameter is two-tenths thousandths smaller than the nick pin. This provides the face of the mold body block with a plurality of grooves in exact parallelism and of the same dimensions and of the same depth in the face of the body block. I then cut a rectangular groove 15 transversely across the face of the body block with a suitable milling tool (Figs. 4, 6) and tightly fit therein a strip 16 of hardened steel (Fig. 8) to form a stop for the nick pins.

The nick pins 17 are made of hardened drill rod of appropriate size and are forced or driven into the grooves 14 to make a tight fit therein. The ends of the nick pins should be ground flat and when driven into the grooves they abut against the transverse strip 16 which forms a stop and guide to fix their position in the body block.

My invention furnishes a simple and inexpensive method of providing the body block of a type mold with the necessary projections for forming the nicks in the type.

This improved method insures the parallelism of the projections or nick pins in both directions so that the mold body will fit snugly on the body block and avoid the formation of fins on the type, and so that the type may be pushed off the body block easily and without binding.

I may provide the body block with any number of the nick pins and in practice it has been found convenient to insert the maximum number of nick pins and thereafter grind down those nick pins that are not required flush with the face of the body block.

In the first operation the rectangular grooves are necessarily milled entirely across the face of the body block but it is not necessary to counter-bore these grooves farther than the transverse strip 16 and hence the boring can be discontinued at the transverse groove before or after this transverse groove is cut.

What I claim and desire to secure by Letters Patent is:

1. The herein described method of providing a type mold body block with projections for forming nicks in the type which consists in cutting a rectangular groove across the face of the type block with a milling tool, then counter-boring the walls of said rectangular groove to form a circular groove thereof which is open at the surface of the body block, and then fitting snugly in said groove a rod which projects above the surface of the block.

2. The herein described method of providing a type mold body block with projections for forming nicks in the type which consists in cutting a rectangular groove of equal depth and width across the face of the body block with a milling tool, then clamping a block on the face of the body block of the same quality and density, then counter-boring the walls of said rectangular groove to form a circular groove partly in the clamping block but the major portion of which is in the body block and then removing the block and fitting snugly in the groove in the body block a rod which projects partly above the surface thereof.

3. The herein described method of providing a type mold body block with projections for forming nicks in the type which consists in cutting a rectangular groove across the face of the body block with a milling tool, then counter-boring the walls of said rectangular groove to form a circular groove opening through the surface of the block, then cutting with a milling tool a rectangular groove transversely across the face of the body block and intersecting said circular groove, then fitting a strip snugly in said transverse groove and then fitting snugly in the circular groove and abutting against said transverse strip a circular rod which projects above the surface of the body block.

4. The method of providing a type mold body block with projections for forming nicks in the type, which consists in cutting a rectangular groove across the face of the type block, under-cutting the walls of said groove to produce a groove of arcuate cross-section for the reception of a nick pin, and fitting snugly in said groove, a rod which projects above the surface of the block.

5. The method of making a type mold body block which consists in cutting a rectangular groove across the face of the type block, and under-cutting the walls of said groove to produce an undercut groove open at one side, for the reception of a nick pin.

6. The method of under-cutting a type mold body block for the reception of a nick pin, which consists in cutting a rectangular groove across the face of the type block and then counter-boring the walls of said rectangular groove, to form a circular groove, open at one side, and into which the nick pin may be inserted longitudinally.

HENRY H. HARDINGE.

Witnesses:
Wm. O. Belt,
M. A. Kiddie.